United States Patent [19]
Nakamura

[11] Patent Number: 5,648,303
[45] Date of Patent: Jul. 15, 1997

[54] NON-MAGNETIC CERAMICS FOR RECORDING/REPRODUCING HEADS AND METHOD OF PRODUCING THE SAME

[75] Inventor: Tsunehiko Nakamura, Kokubu, Japan

[73] Assignee: Kyocera Corporation, Kyoto, Japan

[21] Appl. No.: 395,221

[22] Filed: Feb. 27, 1995

[30] Foreign Application Priority Data

| Feb. 25, 1994 | [JP] | Japan | 6-027807 |
| Feb. 25, 1994 | [JP] | Japan | 6-027808 |
| Feb. 25, 1994 | [JP] | Japan | 6-029864 |
| Apr. 13, 1994 | [JP] | Japan | 6-074547 |

[51] Int. Cl.$^6$ .................................. C04B 35/00
[52] U.S. Cl. .................. 501/87; 264/663; 264/666; 501/89; 501/96.3; 501/102; 501/127; 501/134; 501/153
[58] Field of Search ................. 501/89, 96, 87, 501/98, 102, 127, 134, 153; 262/65, 66

[56] References Cited
U.S. PATENT DOCUMENTS

| 4,430,440 | 2/1984 | Wada et al. | 501/127 |
| 4,518,398 | 5/1985 | Tanaka et al. | 501/153 |

FOREIGN PATENT DOCUMENTS

| 62-182155 | 8/1987 | Japan . |
| 63-282158 | 11/1988 | Japan . |
| 1-140901 | 6/1989 | Japan . |
| 1-201067 | 8/1989 | Japan . |
| 55-126569 | 9/1990 | Japan . |
| 2-243559 | 9/1990 | Japan . |
| 5-294716 | 11/1993 | Japan . |

OTHER PUBLICATIONS

Reed, *Introduction to the Principles of Ceramic Processing,* 1988, pp. 471. No month.

*Primary Examiner*—Melissa Bonner
*Attorney, Agent, or Firm*—Loeb & Loeb LLP

[57] ABSTRACT

Non-magnetic ceramics for recording/reproducing heads comprising an alumina and any one of a compound selected from silicon carbide, boron carbide, zirconium carbide, titanium oxide, aluminum boride or zirconium boride, said ceramics having a Young's modulus of not smaller than 370 Gpa and a surface coarseness Ra after milling of not larger than 100 nm, and a method of producing the same.

13 Claims, 1 Drawing Sheet

FIG. 1

NON-MAGNETIC CERAMICS FOR RECORDING/REPRODUCING HEADS AND METHOD OF PRODUCING THE SAME

BACKGROUND OF THE INVENTION

1. Field of the Invention

The present invention relates to non-magnetic ceramics for recording/reproducing heads used for a ceramic substrate for thin-film magnetic heads, for a slider for a variety of magnetic heads, for a spacer for magnetic heads, for a guide for magnetic recording tapes, etc., and to a method of producing the same. In particular, the invention relates to non-magnetic ceramics for recording/reproducing heads that makes it possible to prepare a head that is highly precisely machined owing to its large hardness and large Young's modulus and to provide a data recording device featuring excellent reliability, the non-magnetic ceramics for recording/reproducing heads exhibiting a small frictional force and adhesive force with respect to the recording disks and the recording tapes which are recording media having a high density.

2. Description of the Prior Art

In recent years, the effort for increasing the density of magnetic recording has been realized at an ever rapid rate. Accompanying this tendency toward ever higher recording density, attention has now been given to a thin-film head which utilizes a thin magnetic film and is adapted to increasing the density of magnetic recording, and which can be used as a recording/reproducing magnetic head for media of high coercive force such as hard disk, 8-mm VTR, electronic still camera, video floppy, digital audio equipment, etc. to substitute for the conventional magnetic heads using ferrite or the like.

A thin-film head utilizing a thin magnetic film is obtained, for example, as described below. First, on the surface of a substrate which is 6 inches or 3 inches in diameter is formed an insulating film of alumina by sputtering, and several thousands of transducers are formed on the upper surface of the alumina film relying upon lithography. An alumina insulating film is formed again on the substrate on which the transducers have been formed. The individual magnetic heads are then cut out from the substrate by taking into consideration the polishing margin which serves as a slider. The bar members that are cut out and are including the thin-film heads, are then polished on their surfaces on one side to obtain slide surfaces.

Accompanying an increase in the recording density of the Winchestor-type magnetic head in recent years, however, the flying height of the magnetic head over the surface of the disk is decreasing down to the order or submicrons or smaller. Due to a difference in the peripheral speed between the inner periphery and the outer periphery of the magnetic disk, however, the flying height of the slider undergoes a change. In order to decrease the change in the floating amount, it has heretofore been proposed not only to provide a positive pressure portion on the air bearing surface as in a customary manner but also to form a negative pressure portion by forming tiny grooves (recessed portions) in part of the slide surface, in an attempt to uniformalize the floating amount of the head from the inner periphery through up to the outer periphery of the disk.

Because of the above-mentioned reasons, therefore, the slide surface which is one of the surfaces of the bar member cut out from the substrate is polished and, then, grooves (recessed portions) are formed in the slide surface. The grooves are usually formed by machining. When a negative-pressure slider is to be formed, the grooves will be formed in a size of several microns by milling using an ion beam, milling using reactive ions, chemical etching, etc.

In the conventional thin-film head, the bar member for slider is warped by several microns per a length of 50 mm at the time of cutting out the bar member and the depth of magnetic gap (throat height) in the slide surface changes by several microns without, however, affecting the electric properties in relation to the reproduction and recording.

In the magnetic head for high-density recording, however, variation in the gap depth caused by warping deteriorates the electric properties. Therefore, the amount of warping must be in the order of submicrons or smaller per a length of 50 mm in a state where the bar member for slider is cut out. In the magnetic heads for high-density recording, an alumina/titanium carbide material has heretofore been used as a slider material. With the material of this type, the warping can be decreased to some extent in a state where the bar member slider is cut out, which warping, however, is still so great that a large load is produced during the cutting operation by using a diamond grinder, and the cutting is not accomplished within short periods of time maintaining precision.

In forming grooves in the bar for slider, furthermore, the slide surface must be finely machined by ion milling, etc. In this case, the machining time and the uniformity in the machined surface are important factors in the production from the standpoint of mass productivity and precision. Using the conventional alumina/titanium carbide composite material, however, the milling rate is small and the surface becomes rugged to a large extent after the milling. In recent years, therefore, it has been demanded to provide a material which can be milled at an increased rate and acquires small ruggedness in the surface after milling.

Moreover, the conventional slider material composed of alumina/titanium carbide for thin-film heads exhibits a large adhesive force or a frictional force with relative to the disk, which could result in a trouble such as head crash impairing the reliability of the data recording device to a serious degree. Even from the standpoint of improving reliability of the magnetic head, it has been urged to provide a material having excellent slide properties, suppressing the frictional force and the absorptive force between the magnetic head and the disk.

In order to reduce the frictional force or the adhesive force between the recording disk and the recording/reproducing head, there has been proposed to form a crown or the like on the air bearing surface of the head. In this case, however, the size of the crown is of the order of several nanometers which can be realized by using a machining jig and a device of very high precision making it, therefore, difficult to mass-produce the heads at a reduced cost.

SUMMARY OF THE INVENTION

The object of the present invention is to provide non-magnetic ceramics for recording/reproducing heads, which is little deformed at a moment when the bar member is cut out or during the grinding, which can be finely machined producing reduced load during the grinding, which can be milled at an increased rate, acquires ruggedness to a small degree after the fine machining such as milling, exhibits a small adhesive force or frictional force relative to the disk and exhibits excellent slide property.

The present inventors have forwarded the study in an attempt to solve the above-mentioned problems, and have discovered the fact that a non-magnetic material for recording/reproducing heads is little deformed at a moment when the bar member for slider is machined and can further be machined finely and easily when the Young's modulus of the material is increased.

The present inventors have further discovered the fact that the non-magnetic ceramics for recording/reproducing heads constituted by alumina and a compound selected from a particular carbide, oxide or boride, exhibits large Young's modulus, produces small load during the machining, milled at an increased rate, acquires small ruggedness in the surface after finely machined by milling, exhibits a small adhesive force or frictional force relative to the disk and exhibits excellent slide property, and have thus arrived at the present invention.

According to the present invention, there are provided non-magnetic ceramics for recording/reproducing heads comprising an alumina and any one of a compound selected from silicon carbide, boron carbide, zirconium carbide, titanium oxide, aluminum boride or zirconium boride, said ceramics having a Young's modulus of not smaller than 370 GPa and a surface coarseness Ra after milling of not larger than 100 nm, and a method of producing the same.

According to one aspect of the present invention, there are provided non-magnetic ceramics for recording/reproducing heads comprising 5 to 80% by volume of an alumina and 40 to 95% by volume of a silicon carbide, and a method of producing the same.

The ceramics of this aspect exhibits excellent precision machinability, produces small load during the polishing, machined at an increased rate by ion milling, acquires ruggedness to a small extent in the surface after finely machined, exhibits small adhesive force or frictional force relative to the disk, and exhibits excellent slide property.

According to another aspect of the present invention, there are provided non-magnetic ceramics for recording/reproducing heads comprising 95 to 45% by volume of an alumina and 5 to 55% by volume of any one of zirconium carbide or boron carbide, and a method of producing the same.

The ceramics according to this aspect exhibits excellent properties like those of the above-mentioned first aspect.

According to a further aspect of the present invention, there are provided non-magnetic ceramics for recording/ reproducing heads comprising 99 to 89% by volume of an alumina and 1 to 17% by volume of a titanium oxide, and a method of producing the same.

The ceramics of this aspect exhibits excellent properties like those of the above-mentioned aspects.

According to a still further aspect of the present invention, there are provided non-magnetic ceramics for recording/ reproducing heads comprising 99 to 5% by volume of an alumina and 1 to 95% by volume of an aluminum boride, and a method of producing the same.

According to a yet further aspect of the present invention, there are provided non-magnetic ceramics for recording/ reproducing heads comprising 95 to 5% by volume of an alumina and 5 to 95% by volume of a zirconium boride, and a method of producing the same.

DETAILED DESCRIPTION OF THE PREFERRED EMBODIMENTS

The present invention is concerned with non-magnetic ceramics for recording/reproducing heads comprising an alumina and a particular compound selected from carbide, oxide or boride. The feature of the present invention resides in that the ceramics has a large Young's modulus, produces a small load during the machining, milled at an increased rate, acquires a small degree of ruggedness in the surface after finely machined by milling, exhibits a small adhesive force or frictional force relative to the disk, and exhibits excellent slide property.

The ceramics according to the first aspect of the invention comprises an alumina and a silicon carbide, the alumina being contained in an amount of from 5 to 60% by volume and the silicon carbide being contained in an amount of from 40 to 95% by volume.

In the ceramics of this aspect, when the amount of the silicon carbide is not larger than 40% by volume (when the amount of the alumina is not smaller than 80% by volume), the Young's modulus becomes not larger than 400 GPa, and it becomes difficult to flatly machine the air bearing surface of the slider maintaining precision. When the amount of the silicon carbide exceeds 95% by volume (when the amount of the alumina becomes not larger than 5% by volume), on the other hand, the sintered product loses density. It is desired that the silicon carbide is contained in an amount of from 43 to 95% by volume and the alumina is contained in an amount of from 5 to 57% by volume from the standpoint obtaining a large Young's modulus, and it is desired that the silicon carbide is contained in an amount of from 40 to 80% by volume and the alumina is contained in an amount of from 60 to 40% by volume from the standpoint of obtaining a high density.

It is desired that the non-magnetic ceramics of this aspect of the present invention contains the Zirconia in an amount of from 0.1 to 5 parts by weight per 100 parts by weight of the main components that comprise the silicon carbide and the alumina. This is because, addition of the zirconia helps improve chipping property at the time of machining. It is desired that the zirconia is contained in an amount of from 0.1 to 5 parts by weight with respect to the main components because of the reason that when the amount of the zirconia is smaller than 0.1 part by weight, edges formed by using a diamond wheel or by groove-machining tend to be broken off and when its amount is not smaller than 5 parts by weight, the Young's modulus of the material tends to decrease. It is desired that the zirconia is contained in an amount of from 3 to 5 parts by weight per 100 parts by weight of the main components of the silicon carbide and the alumina from the standpoint of obtaining chipping-resistant property, and is contained in an amount of from 0.1 to 3 parts by weight from the standpoint of obtaining a large Young's modulus.

It is further desired that the non-magnetic ceramics of this aspect of the invention has a Young's modulus of not smaller than 410 GPa. When the Young's modulus is not larger than 410 GPa, the bar member for slider tends to be deformed to a slightly large degree when it is cut out.

It is particularly desired that the Young's modulus is not smaller than 420 GPa.

The non-magnetic ceramics of this aspect of this invention comprises the alumina and the silicon carbide as chief components but may further contain mullite in addition to zirconia.

The non-magnetic ceramics of the present invention is obtained by subjecting a mixture powder of the silicon carbide having an average particle diameter of, for example, not larger than 1 μm (50% particle diameter as measured by microtrack, which stands for a particle diameter at which an integrated volume percentage becomes 50% in the graph of integrated volume percentage) and the alumina to a hot-press processing or to a hot isostatic pressure processing (HIP), or is obtained by subjecting a molded product of the above mixture powder to the hot-press processing or to the hot isostatic pressure processing, or is obtained by subjecting a sintered product that is obtained by molding and sintering the above mixture powder as described above to the hot-press processing or to the hot isostatic pressure processing. Among them, what is particularly desired is that a pre-sintered product prepared in a vacuum firing furnace or in a firing furnace in a reducing atmosphere is subjected to the hot isostatic pressure processing.

The average particle diameter of silicon carbide which is a starting material is selected to be not larger than 1 μm. This is because when the average particle diameter becomes larger than 1 μm, the sintering must be carried out at an increased temperature whereby the particle size of the alumina crystals becomes so large as to form pores, which are difficult to remove, in the sintered product. Moreover, even when the sintered product is obtained in a dense form, the surface coarseness Ra becomes larger than 100 nm after the surface is finely worked by ion milling, which is not desirable as a slider material. It is desired that the silicon carbide which is a starting material has a particle diameter that is not larger than 0.3 μm.

The alumina which is another starting material is used having a standard average particle diameter which is usually from 0.2 to 1 μm. Moreover, the firing is done relying upon the hot-press processing or the hot isostatic pressure processing, since it is capable of removing pores greater than 1 μm in the sintered product. The hot-press processing should be carried out in a carbon mold under the conditions of a pressure of from 100 to 500 kgf/cm$^2$ at 1700° to 2000° C. for 0.5 to 2 hours, and the hot isostatic pressure processing should be carried out in an argon or nitrogen atmosphere under the conditions of a pressure of 500 to 2000 kgf/cm$^2$ at 1550° to 1900° C. for one hour.

Figure 1:
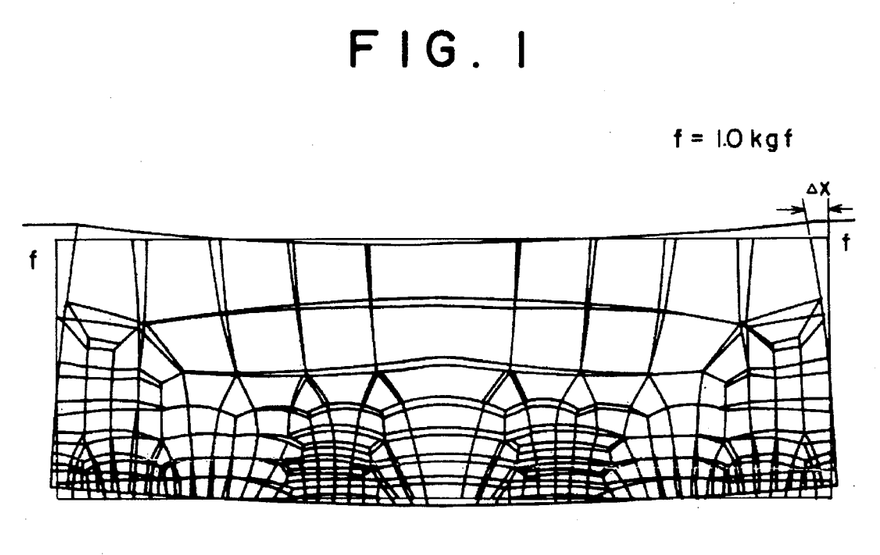
FIG. 1 is a schematic diagram where the amount of deformation of non-magnetic ceramics of the present invention is calculated by a finite element method in a state of exerting a load on the non-magnetic ceramics that is being specularly machined.

In specular-machining the air bearing surface of the slider, the flatness of the air bearing surface facing the disk must be strictly controlled as the flying height decreases. FIG. 1 is a schematic diagram where the amount of deformation of a work is calculated relying upon a finite element method in a state where a load is exerted on the work that is being specular-machined. In this state where the work is fixed to a work-fixing jig using, for example, an adhesive, the force facts upon the ends due to the effect of the adhesive. Here, the work has a shape of 4 nm×1.3 nm×2.5 nm, and the load is 1.0 kgf. Through calculation of the materials having Young's moduli of 13000 kgf/mm$^2$, 25000 kgf/mm$^2$ and 40000 kgf/mm$^2$, the amounts of deformation Δx of the works are 2.19×10$^{-4}$ nm, 1.14×10$^{-4}$ nm and 7.13×10$^{-5}$ nm, from which it will be understood that the amount of deformation decreases with an increase in the Young's modulus.

It will thus be understood that a material having a large Young's modulus is deformed little and can be machined to possess good flatness. Therefore, the silicon carbide having excellent slide property is uniformly dispersed in the alumina which is a chief component having a large Young's modulus, thereby to prepare non-magnetic ceramics having a large Young's modulus. By strictly selecting the firing conditions and starting materials for obtaining a large Young's modulus, it is made possible to prepare a silicon carbide/alumina composite material for recording/reproducing heads that could not be obtained in a dense form.

Upon dispersing SiC having excellent slide property in the alumina having a large Young's modulus, the non-magnetic ceramics for recording/reproducing heads according to the aspect of the invention exhibits increased Young's modulus, deforms little during the grinding using a diamond grinder or the like, can be finely machined producing a small load during the grinding, can be machined at an increased rate by ion milling, acquires decreased ruggedness even after the machining, and exhibits decreased frictional force or absorptive force relative to the disk.

Besides, with the zirconia being contained in the main components of the silicon carbide and the alumina, the ceramics exhibits improved chipping property during the machining and improved surface coarseness after the machining.

The ceramics according to the second aspect of the invention comprises an alumina and a zirconium carbide or a boron carbide, the alumina being contained in an amount of from 95 to 45% by volume and the zirconium carbide or the boron carbide being contained in an amount of from 5 to 55% by volume.

In the ceramics of this aspect, either the zirconium carbide or the boron carbide is contained in an amount of from 5 to 55% by volume (alumina is contained in an amount of from 95 to 45% by volume). This is because when the amount of the zirconium carbide or the boron carbide is smaller than 5% by volume (when the amount of the alumina is larger than 95% by volume), the amount of deformation becomes nearly the same as the amount of deformation of the alumina 30 wt %/titanium carbide composite material that is much used for the existing thin-film heads, and little effect is exhibited for preventing the bar material from deforming after the slice working. Besides, the slide property is deteriorated.

When the amount of the zirconium carbide or the boron carbide exceeds 55% by volume (when the amount of the alumina becomes smaller than 45% by volume), it becomes difficult to obtain the sintered product in a dense form. From the standpoint of sintering property, in particular, it is desired that the zirconium carbide or the boron carbide is contained in an amount of from 10 to 45% by volume and the alumina is contained in an amount of from 90 to 55% by volume. From the standpoint of slide property, furthermore, it is desired that the zirconium carbide or the boron carbide is contained in an amount of 5 to 55% by volume and the alumina is contained in an amount of 95 to 45% by volume.

The zirconium carbide that is added may partly undergo oxidation reaction to turn into a zirconium oxide. Furthermore, the boron carbide that is added may partly undergo the reaction with the alumina to form an aluminum borate ($Al_{18}B_4O_{33}$). A substrate having good uniformity can be obtained when the ratio (I(111)/I(003)) of an X-ray diffraction peak of the plane (003) of $B_4C$ to the peak intensity of the plane (111) of the aluminum boride is not larger than 1 in the X-ray diffraction pattern on the ground surface of the aluminum boride. When the amount of the aluminium boride exceeds 30% by weight, the uniformity of the substrate is impaired; i.e., the composition becomes different between the inside of the substrate and the peripheral portion thereof, which is not desirable from the standpoint of obtaining a homogeneous slider material.

In the non-magnetic ceramics of this aspect of the invention, it is desired that zirconia is contained in an amount of from 0.1 to 5 parts by weight per 100 parts by weight of the main components of either one of the zirconium carbide or the boron carbide and the alumina. This is because, the addition of the zirconia helps improve chipping property during the machining. Here, the zirconia is added in an amount of from 0.1 to 5 parts by weight with respect to the chief components because of the reason that when the amount of the zirconia is not larger than 0.1 part by weight, its effect is not distinctly exhibited and when the amount of the zirconia is larger than 5 parts by weight, on the other hand, the material exhibits a decreased Young's modulus which is not desirable. It is desired that the zirconia is added in an amount of from 2 to 5 parts by weight per 100 parts by weight of the main components of the zirconium carbide or the boron carbide and the alumina from the standpoint of sintering property, and is added in an amount of from 0.1 to 3 parts by weight from the standpoint of chipping-resistant property.

In this aspect, it is desired that the ceramics exhibits the Young's modulus which is not smaller than 380 GPa. When the Young's modulus is not larger than 380 GPa, the amount of bending tends to increase during the cutting. From the standpoint of decreasing the amount of bending during the cutting, it is desired that the Young's modulus is smaller than 410 GPa and is, most preferably, about 400 GPa from the standpoint of obtaining excellent machining properties.

The non-magnetic ceramics of this aspect of the invention is obtained by subjecting a mixture powder of the zirconium carbide or the boron carbide having a particle diameter of not larger than 2.0 µm and the alumina to the hot-press processing or to the hot isostatic pressure processing or by subjecting a sintered product obtained by molding and sintering the above mixture powder to the hot-press processing or the hot isostatic pressure processing.

It is, however, particularly desired to subject a pre-sintered product which is prepared in a vacuum firing furnace or in a firing furnace is a reducing atmosphere to the hot isostatic pressure processing.

The average particle diameter (at which the volume percentage becomes 50% in the integrating particle diameter distribution relying on the microtrack) of the zirconium carbide or the boron carbide which is the starting material is selected to be not larger than 2.0 µm. This is because, when the average particle diameter is larger than 2.0 µm, the sintering must be carried out at a high temperature whereby the particle diameter of alumina crystals increases making it difficult to remove pores. Even when the sintered product is formed in a dense form, furthermore, the particle diameter of the sintered product is not smaller than 2 µm, whereby the surface coarseness Ra becomes as large as 100 nm or more in the surface after the machining by iron milling, which is not suited for use as a slider material.

Moreover, the mixture powder is subjected to the hot-press processing or to the hot isostatic pressure processing, in an attempt to increase the density of the sintered product to be not smaller than 88% and to remove pores not smaller than 1 µm.

The hot-press processing should be carried out in a carbon mold under a pressure of 100 to 500 kgf/cm$^2$ at 1500° to 1900° C. for 0.5 to 2 hours and the hot isostatic pressure processing should be carried out in an argon or a nitrogen atmosphere under a pressure of 500 to 2000 kgf/cm$^2$ at 1400° to 1800° C. for 1 to 2 hours.

By using the zirconium carbide or the boron carbide having an average particle diameter (50% particle diameter by the microtrack) of not larger than 1.0 µm as a starting material, furthermore, it is allowed to prepare a dense composite material at a temperature lower than 1900° C. at the time of the hot-press processing or the hot isostatic pressure processing and having an average particle diameter of not larger than 2.0 µm.

The non-magnetic ceramics for recording/reproducing heads according to this aspect of the present invention is constituted by the zirconium carbide or the boron carbide having a large Young's modulus and the alumina. Therefore, the ceramics itself exhibits a large Young's modulus, and suppresses the deformation during the cutting, groove machining or specular machining using a diamond grinder or the like, milled at an increased rate, acquires ruggedness to a small degree after the milling, and exhibits a reduced frictional force or adhesive force relative to the disk.

With the zirconia being contained in the chief components of the zirconium carbide, boron carbide and the alumina, chipping property is improved during the machining and the surface coarseness is improved after the machining. The ceramics according to the third aspect of the invention comprises the alumina and the titanium oxide, the alumina being contained in an amount of 99 to 83% by volume and the titanium oxide being contained in an amount of 1 to 17% by volume.

It is further desired to contain the zirconia in an amount of from 0.1 to 5 parts by weight per 100 parts by weight of the main components comprising the alumina and the titanium oxide.

Moreover, it is particularly desired to contain the zirconia in an amount of from 0.1 to 5 parts by weight per 100 parts by weight of the main components comprising 99 to 83% by weight of the alumina and 1 to 17% by weight of the titanium oxide, so that the ceramics exhibits a volume resistivity of not smaller than $10^{10}$ Ω-cm.

The non-magnetic ceramics for recording/reproducing heads is obtained by subjecting a mixture powder containing 1 to 17% by volume of the titanium oxide which are starting materials having an average particle size of, for example, not larger than 0.6 µm, and 99 to 83% by volume of the alumina, or by subjecting a molded product of this mixture powder, or by subjecting a sintered product of this mixture powder to the hot-press processing or to the hot isostatic pressure processing. Or, the non-magnetic ceramics for recording/reproducing heads is obtained by subjecting the mixture powder containing 1 to 17% by volume of the titanium oxide which are starting materials having an average particle diameter of, for example, not larger than 0.6 µm, and 99 to 83% by volume of the alumina, or by subjecting a molded product of this mixture powder, or by subjecting a sintered product of this mixture powder to the hot-press processing or to the hot isostatic pressure processing, followed by the heat treatment at 800° to 1200° C. in an oxidizing atmosphere.

Here, the ratio of the titanium oxide and the alumina is limited as described above. This is because when the amount of the titanium oxide is not larger than 1% by volume (when the amount of the alumina is not smaller than 99% by volume), the slide property and sintering property are not much improved by the titanium oxide. When the amount of the titanium oxide exceeds 17% by volume (the amount of the alumina becomes not larger than 83% by volume), on the other hand, the Young's modulus becomes not larger than 370 GPa, whereby the deformation of the bar member increases during the machining and it becomes difficult to flatly machine the floating surface of the slider maintaining precision. From the standpoint of frictional force or adhesive force relative to the disk that pertains to the slide property, furthermore, it is desired that the titanium oxide is contained in an amount of 10 to 17% by volume and the alumina is contained in an amount of 90 to 83% by volume. From the standpoint of warping of the bar member for slider or from the standpoint of machining a flat slide surface maintaining precision, furthermore, it is desired that the titanium oxide is contained in an amount of 3.6 to 10.1% by volume and the alumina is contained in an amount of 96.4 to 89.9% by volume.

It is desired that the non-magnetic ceramics of this aspect of the invention contains the zirconia in an amount of from 0.1 to 5 parts by weight per 100 parts by weight of the main components of the titanium oxide and the alumina. This is because, the addition of the zirconia helps improve the chipping property during the machining. Here, the zirconia is contained in an amount of from 0.1 to 5 parts by weight per the main components. This is because when the amount of the zirconia is not larger than 0.1 parts by weight, the edge portions machined by using a diamond grinder or by the groove machining tends to be broken off. When the amount of the zirconia is not smaller than 5 parts by weight, on the other hand, the material tends to exhibit decreased Young's modulus. From the standpoint of obtaining a flat slide surface, the amount of the zirconia should be 3 to 5 parts by weight and from the standpoint of obtaining a large Young's modulus, the amount of the zirconia should be from 0.1 to 3 parts by weight per 100 parts by weight of the main components of the titanium oxide and the alumina.

When an electrode is directly mounted to the slider, it is desired that the non-magnetic ceramics of this aspect of the invention has a volume resistivity of not smaller than $10^{10}$ $\Omega$-cm. This is because, when the volume resistivity is not larger than $10^{10}$ $\Omega$-cm, the ceramics becomes close to an electrically conducting material permitting the electric current to leak. The volume resistivity should be not smaller than $1\times10^{11}$ $\Omega$-cm from the standpoint of an insulating material, and should most desirably be not smaller than $1\times10^{12}$ $\Omega$-cm from the standpoint of preventing the leakage of current. In the non-magnetic ceramics of the present invention, it is desired that the average particle diameter of the titanium oxide in the sintered product is not larger than 1 μm. This is from the standpoint of decreasing the surface coarseness on the surface machined by ion milling. It is desired that the titanium oxide has an average particle diameter of not larger than 0.6 μm and, particularly, not larger than 0.3 μm.

The non-magnetic ceramics of this aspect of the present invention is obtained by subjecting a mixture powder of the titanium oxide having an average particle diameter of, for example, not larger than 0.6 μm (50% particle diameter as measured by microtrack, which stands for a particle diameter at which an integrated volume percentage becomes 50% in the graph of integrated volume percentage) and the alumina to a hot-press processing or to a hot isostatic pressure processing (HIP), or is obtained by subjecting a molded product of the above mixture powder to the hot-press processing or to the hot isostatic pressure processing, or is obtained by subjecting a sintered product that is obtained by molding and sintering the above mixture powder as described above to the hot-press processing or to the hot isostatic pressure processing. Among them, what is particularly desired is that a pre-sintered product prepared in a vacuum firing furnace or in a firing furnace in an oxidizing atmosphere is subjecting to the hot isostatic pressure processing.

The average particle diameter of titanium oxide which is a starting material is selected to be not larger than 0.6 μm. This is because when the average particle diameter becomes larger than 0.6 μm, the sintering must be carried out at an increased temperature whereby the particle size of the alumina crystals becomes so large as to form pores, which are difficult to remove, in the sintered product. Moreover, even when the sintered product is obtained in a dense form, the surface coarseness Ra becomes larger than 100 nm after the surface is finely worked by ion milling, which is not desirable as a slider material. It is desired that the titanium oxide which is a starting material has a particle diameter that is not larger than 0.3 μm and, particularly, not larger than 0.2 μm.

Moreover, the firing is done relying upon the hot-press processing or the hot isostatic pressure processing, since it is capable of removing pores greater than 1 μm in the sintered product. The hot press processing should be carried out in a carbon mold under the conditions of a pressure of from 50 to 500 kgf/cm² at 1100° to 1300° C. for 0.5 to 1 hour, and the hot isostatic pressure processing should be carried out in an argon or nitrogen atmosphere under the conditions of a pressure of 500 to 2000 kgf/cm² at 1000° to 1300° C. for one hour.

According to this aspect of the present invention, it is desired that the ceramics is subjected to the hot-press processing or to the hot isostatic pressure processing and is then heat-treated in an oxidizing atmosphere at 800° to 1200° C. in order to increase the volume resistivity. Here, the heat-treatment is carried out at a temperature of from 800° to 1200° C. because of the reason that when the temperature is not higher than 800° C., the volume resistivity cannot be increased to a sufficient degree and when the temperature is not lower than 1200° C., pores are formed.

According to this aspect of the invention, the non-magnetic ceramics is obtained by uniformly dispersing the titanium oxide having excellent slide property in the alumina having a large Young's modulus. Therefore, the ceramics exhibits an increased Young's modulus, deformed little during the grinding by using a diamond grinder or the like, can be precisely machined producing a decreased load during the grinding, can be machined at an increased rate by ion milling, acquires ruggedness to a small degree after the machining, and exhibits decreased frictional force or adhesive force relative to the disk.

By containing zirconia in the main components of the titanium oxide and the alumina, furthermore, it is allowed to improve chipping property during the machining and to improve surface coarseness after the machining.

By selecting the particle diameter of the titanium oxide which is a starting material to be not larger than 0.8 μm (50% particle diameter by microtrack), furthermore, the pre-firing can be executed at a temperature over a range of as wide as from 1175° to 1300° C. prior to the hot press or the HIP processing, whereby there is obtained a pre-sintered product having a relative density of not smaller than 95% enabling the subsequent HIP processing to be carried out. In addition, by using the titanium oxide having the particle diameter of not larger than 0.8 μm, it is allowed to prepare a composite material having an average particle diameter of not larger than 1.0 μm. When the particle diameter of the titanium oxide is larger than 0.6 μm, limitation is imposed on the range of the pre-firing temperature making it difficult to obtain a stable pre-sintered product having a relative density of not smaller than 95%. The particle diameter of the titanium oxide increases with an increase in the pre-firing temperature. As the temperature exceeds 1300° C., the titanium oxide and the alumina react with each other to form an aluminum titanate which exhibits a decreased hardness and a decreased Young's modulus. Therefore, the aluminum titanate should be formed to such an extent that it cannot be detected by the X-ray diffraction measurement. The material having a high pre-firing temperature and having an average particle diameter of titanium oxide of not smaller than 1 μm exhibited a surface coarseness Pa of not smaller than 100 nm in the surface machined by ion milling, and was not suited for use as a slider material.

In order to increase the insulating property of the slider, furthermore, it is desired to carry out the hot isostatic pressure processing (HIP) in an argon atmosphere. The ceramics prepared by the hot-press processing in the carbon mold has a volume resistivity of as small as $10^4$ Ω-cm. When insulating property is required, furthermore, the ceramics subjected to the hot press processing or to the HIP processing is further heat-treated in an oxidizing atmosphere to increase the volume resistivity to be not smaller than $10^{10}$ Ω-cm.

The ceramics according to the fourth aspect of the present invention comprises the alumina and the aluminum boride, the alumina being contained in an amount of from 99 to 5% by volume and the aluminum boride being contained in an amount of from 1 to 95% by volume.

In the ceramics of this aspect, the aluminum boride and the alumina were limited to the above-mentioned ratios because of the reason that when the amount of the aluminum boride is not larger than 1% by volume (when the amount of the alumina is larger than 99% by volume), the Young's modulus so decreases that the bar member undergoes deformation when it is being cut out, and it becomes difficult to flatly machine the air bearing surface of the slider maintaining precision and, besides, the sintering property is deteriorated permitting pores of larger than 1 μm to be formed. When the amount of the aluminum boride exceeds 95% by volume (when the amount of the alumina becomes smaller than 5% by volume), on the other hand, the Young's modulus decreases and it becomes difficult to obtain a sintered product in a dense form. From the standpoint of sintering property, in particular, it is desired that the aluminum boride is contained in an amount of from 10 to 60% by volume and the alumina is contained in an amount of from 90 to 40% by volume and from the standpoint of slide property, it is desired that the aluminum boride is contained in an amount of from 10 to 50% by volume and the alumina is contained in an amount of from 90 to 50% by volume.

Examples of the aluminum boride include $AlB_2$, $AlB_{12}$, $AlB_{10}$, and mixtures thereof. The aluminum boride may contain trace amounts of unavoidable impurities.

In the non-magnetic ceramics of the present invention, it is desired that the zirconia is contained in an amount of from 0.1 to 5 parts by weight per 100 parts by weight of the main components of the aluminum boride and the alumina. This is because the addition of the zirconia helps improve the chipping property during the machine and make it possible to obtain a sharp edges. Here, the zirconia is contained in an amount of from 0.1 to 5 parts by weight with respect to the main components because of the reason that when the amount of the zirconia is smaller than 0.1 part by weight, edge portions machined by using a diamond wheel or by the groove machining tend to be broken off and when the amount of the zirconia is larger than 5 parts by weight, the ceramics exhibits decreased Young's modulus, which is not desirable. The zirconia should be contained in an amount of from 2 to 5 parts by weight per 100 parts by weight of the main components of the aluminum boride and the alumina from the standpoint of sintering property and should be contained in an amount of from 0.1 to 3 parts by weight from the standpoint of chipping-resistant property.

It is further desired that the non-magnetic ceramics of this aspect of the invention exhibits a Young's modulus of larger than 400 GPa. When the Young's modulus is not larger than 400 GPa, the bar member for slider tends to be deformed to a large extant when it is being cut out.

Particularly desirably, the Young's modulus should not be smaller than 420 GPa from the standpoint of suppressing deformation during the machining such as cutting.

The non-magnetic ceramics according to this aspect of the invention comprises chiefly the alumina and the aluminum boride, but may further contain a carbide or a boride, SiC, $B_4C$ of an element of the Group 4b of periodic table in an amount of not larger than 30% by weight.

The non-magnetic ceramics of this aspect of the present invention is obtained by subjecting a mixture powder of the aluminum boride having an average particle diameter of, for example, not larger than 2 μm (50% particle diameter as measured by microtrack, which stands for a particle diameter at which an integrated volume percentage becomes 50% in the graph of integrated volume percentage) and the alumina to a hot-press processing or to a hot isostatic pressure processing (HIP), or is obtained by subjecting a molded product of the above mixture powder to the hot-press processing or to the hot isostatic pressure processing, or is obtained by subjecting a sintered product that is obtained by molding and sintering the above mixture powder as described above to the hot-press processing or to the hot isostatic pressure processing. Among them, what is particularly desired is that a pre-sintered product prepared in a vacuum firing furnace or in a firing furnace in a reducing atmosphere is subjected to the hot isostatic pressure processing.

The average particle diameter of the aluminum boride which is a starting material is selected to be not larger than 2 μm. This is because when the average particle diameter becomes larger than 2 μm, the sintering must be carried out at an increased temperature whereby the particle size of the alumina crystals becomes so large as to form pores, which are difficult to remove, in the sintered product. Moreover, even when the sintered product is obtained in a dense form, the surface coarseness Ra becomes larger than 100 nm after the surface is finely worked by ion milling, which is not desirable as a slider material. It is desired that the aluminum boride which is a starting material has a particle diameter that is not larger than 0.5 μm. The alumina which is a starting material should have a standard average particle diameter which is usually from 0.2 to 1 μm. Moreover, the firing is done relying upon the hot press or the hot isostatic pressure processing, since it is capable of removing pores greater than 1 μm in the sintered product. The hot press processing should be carried out in a carbon mold under the conditions of a pressure of from 100 to 500 kgf/cm$^2$ at 1500° to 1900° C. for 0.5 to 2 hours, and the hot isostatic pressure processing should be carried out in an argon or nitrogen atmosphere under the conditions of a pressure of 500 to 2000 kgf/cm$^2$ at 1400° to 1800° C. for one hour.

The non-magnetic ceramics for recording/reproducing heads according to this aspect of the present invention comprises the aluminum boride having a large Young's modulus and the alumina, and exhibits an increased Young's modulus, deformed little during the cutting, grooving or specular machining by using a diamond grinder, produces a reduced load during the machining, acquires ruggedness to a small degree after the ion milling, and exhibits decreased frictional force or adhesive force relative to the disk.

By containing the zirconia in the main components of the aluminum boride and the alumina, furthermore, it is allowed to improve chipping property during the machining and to improve surface coarseness after the machining.

The ceramics according to the fifth aspect of the invention comprises the alumina and the zirconium boride, the alumina being contained in an amount of from 95 to 5% by volume and the zirconium boride being contained in an amount of from 5 to 95% by volume.

In the ceramics of this aspect, the zirconium boride is contained in an amount of from 5 to 95% by volume and the alumina is contained in an amount of from 95 to 5% by volume. This is because when the amount of the zirconium boride is smaller than 5% by volume (when the amount of the alumina is larger than 95% by volume), the ceramics is deformed in an amount which is comparable with that of the alumina/titanium carbide material that is much used for the thin-film heads, and is not much capable of preventing the bars from being deformed after machined into slices. Besides, the slide property is deteriorated, too.

When the amount of the zirconium boride exceeds 95% by volume (when the amount of the alumina becomes smaller than 5% by volume), it becomes difficult to obtain a sintered product in a dense form. From the standpoint of sintering property and slide property, in particular, it is desired that the zirconium boride is contained in an amount of from 10 to 50% by volume and the alumina is contained in an amount of from 90 to 50% by volume.

It is further desired to contain the zirconia in an amount of from 0.1 to 5 parts by weight per 100 parts by weight of the main components of the zirconium boride and the alumina from the standpoint of improving chipping property during the machining.

In the non-magnetic ceramics of this aspect of the invention, it is desired that the Young's modulus is not smaller than 380 GPa. When the Young's modulus is smaller than 380 GPa, the amount of bending increases during the cutting.

The Young's modulus should be larger than 410 GPa from the standpoint of reducing the amount of bending during the cutting and should most desirably be larger than 400 GPa from the standpoint of obtaining excellent machining property.

The non-magnetic ceramics of this aspect of the present invention is obtained by subjecting a mixture powder of the zirconium boride having an average particle diameter of, for example, not larger than 1 μm and the alumina to a hot-press processing or to a hot isostatic pressure processing (HIP), or is obtained by subjecting a molded product of the above mixture powder to the hot-press processing or to the hot isostatic pressure processing, or is obtained by subjecting a sintered product that is obtained by molding and sintering the above mixture powder as described above to the hot-press processing or to the hot isostatic pressure processing. Among them, what is particularly desired is that a pre-sintered product prepared in a vacuum firing furnace or in a firing furnace in a reducing atmosphere is subjected to the hot isostatic pressure processing.

The average particle diameter of the zirconium boride which is a starting material is selected to be not larger than 1 μm. This is because when the average particle diameter of the zirconium boride which is the starting material becomes larger than 1 μm, the sintering must be carried out at an increased temperature whereby the particle diameter of the alumina crystals becomes large making it difficult to remove pores. Moreover, even when the sintered product is obtained in a dense form, the sintered product possesses the particle diameter of not smaller than 2 μm, and the surface coarseness Ra becomes larger than 100 nm after the surface is finely worked by ion milling, which is not desirable as a slider material. Moreover, the mixture powder is subjected to the hot-press processing or the hot isostatic pressure processing, since it makes it possible to obtain a sintered product having a density of not smaller than 99% and to remove pores greater than 1 μm. In a system of the zirconium boride and the alumina, the hot-press processing should be carried out in a carbon mold under the conditions of a pressure of from 50 to 500 kgf/cm$^2$ at 1700° to 2000° C. for 0.5 to 2 hours, and the hot isostatic pressure processing should be carried out in an argon or nitrogen atmosphere under the conditions of a pressure of 500 to 2000 kgf/cm$^2$ at 1400° to 1800° C. for one to two hour.

The non-magnetic ceramics for recording/reproducing heads according to the present invention comprises the zirconium boride having a large Young's modulus and the alumina, and exhibits an increased Young's modulus, deformed little during the cutting, specular machining by using a diamond grinder, milled at an increased rate, acquires ruggedness to a small degree after the milling, and exhibits a decreased frictional force or adhesive force relative to the disk.

By containing the zirconia in the main components of the zirconium boride and the alumina, furthermore, it is allowed to improve chipping property during the machining and to improve surface coarseness after the machining.

EXAMPLES

Example 1

A starting powder of silicon carbide having an average particle diameter of 0.4 μm and a starting powder of alumina having an average particle diameter of 0.2 μm were weighed in a manner that the compositions of the sintered products were as shown in Table 1, and were pulverized and mixed together using alumina balls as a medium. The average particle diameters were 50% particle diameters by microtrack.

The thus mixed starting powders were dried, granulated through a sieve of 40 meshes, packaged into a carbon mold, and were hot-pressed under a pressure of 350 kgf/cm$^2$ at 1800° C. for 0.5 hour. The sintered products exhibited properties as shown in Table 1.

TABLE 1

| Sample No. | Composition (vol %) (main components) SiC | Composition (vol %) (main components) Al₂O₃ | Amount of ZrO₂ per 100 parts by weight of main components (parts by wt.) | Density (g/cc) | Hardness (GPa) | Strength (MPa) | Young's modulus (GPa) | Presence of pores | Milling rate (A/min) | Surface coarseness after milling (Ra mm) |
|---|---|---|---|---|---|---|---|---|---|---|
| 1 | 40 | 60 | — | 3.68 | 19.8 | 790 | 400 | yes | 110 | 55 |
| 2 | 42 | 58 | — | 3.66 | 19.1 | 760 | 420 | yes | 130 | 50 |
| 3 | 44 | 56 | 5 | 3.65 | 19.8 | 850 | 435 | yes | 125 | 60 |
| 4 | 44 | 56 | 3 | 3.64 | 19.3 | 840 | 425 | yes | 132 | 63 |
| 5 | 44 | 68 | 1 | 3.64 | 19.7 | 860 | 421 | yes | 129 | 54 |
| 6 | 44 | 58 | 0.1 | 3.62 | 20.0 | 860 | 430 | yes | 130 | 55 |
| 7 | 44 | 56 | — | 3.63 | 20.5 | 880 | 437 | yes | 133 | 63 |
| 8 | 50 | 50 | — | 3.60 | 19.9 | 650 | 425 | yes | 160 | 65 |
| 9 | 85 | 35 | — | 3.46 | 20.2 | 610 | 450 | yes | 155 | 60 |
| 10 | 95 | 5 | — | 3.25 | 19.6 | 580 | 440 | yes | 166 | 68 |
| *11 | 98 | 2 | — | 2.98 | 18.3 | 510 | 370 | no | 170 | 110 |
| *12 | alumina/TiC (alumina, 30 wt %) | | | 4.32 | 18.7 | 661 | 398 | yes | 70 | 110 |

Samples marked with * lie outside the scope of the invention.

The density was measured in compliance with the Archmedes' method and the hardness was measured by using a hardness tester AVK (manufactured by Akashi Mfg. Co.). The measuring conditions consisted of exerting a load of 20 kgf for 15 seconds using a Vickers' indenter, and the measurement was taken relying upon the size of the scar formed by the indenter. The strength was measured based on a three-point bending test across a span of 30 mm by preparing test pieces having a section of 3 mm×4 mm. The head speed at this moment was 0.5 mm/min. The Young's modulus was measured by preparing samples having the same shape as those of measuring the strength, exerting loads at three points, and by measuring the amounts of deformation and gradients of load values. Presence or absence of pores was observed by polishing the samples using 1-μm diamond abrasive particles, and observing the polished surface using a scanning-type electron microscope to find presence of pores which are not smaller than 1 μm.

Next, by using an argon source of Kaufmann-type, the samples were subjected to the milling to find the milling rate and the surface coarseness after milling. The acceleration voltage was 800 V, and the argon beam was allowed to be incident at an angle of 45 degrees with respect to a normal to the surface of the sample being machined. For the purpose of comparison, the alumina/titanium carbide composite material (TF700H) was also subjected to the milling. The surface coarseness was measured by using an atomic force microscope (AFM) manufactured by Digital Instruments Co. As the AFM, use was made of a probe of silicon nitride having a probe tip curvature R of 10 to 30 nm manufactured by Olympus Co. The visual field of measurement was a 10-μm square. The milling rate was found by using a surface coarseness tester and by measuring a step between the milled surface and the covered surface.

It will be understood from Table 1 that the non-magnetic ceramics of the present invention (samples Nos. 1 to 10) have Young's moduli of not smaller than 400 GPa, do not contain pores of larger than 1 μm in the sintered products thereof, are milled at rates of 110 A/min. or larger, and have surface coarseness Ra after milling of not larger than 68, which are favorable properties. On the other hand, the conventional alumina/titanium carbide composite material (sample No. *12) exhibits the Young's modulus of as high as 398 GPa, but produces large load during the machining, milled at a small rate, and develops a large surface coarseness Ra after milling.

Next, the samples Nos. 1 to 10 and the sample No. *12 of Table 1 were cut into sliders each having a size of 1.6×2.2×0.9 and two rails, and were tested by using a CSS tester manufactured by Haruna Tsushin Co. to evaluate the number of times of CSSs, damage to the media and damage to the heads. The testing was conducted by sliding the slider on the disk, revolving the disk at a maximum revolving speed of 3600 rpm, accelerating the disc from the standstill up to 3600 rpm over a period of five seconds, holding the revolving speed of 3600 rpm for three seconds, bringing the disk into a halt 5 seconds thereafter, and holding the standstill state for five seconds. A series of these operations constituted one cycle of CSS. As a result, the sample of No. *12 was damaged on the disk or on the head after 30000 times of CSSs, whereas the composite materials of the samples Nos. 1 to 10 of the present invention were not damaged even after 30000 times of CSSs and exhibited excellent slide property.

Example 2

A starting powder of silicon carbide having an average particle diameter of 1.0 μm and a starting powder of alumina having an average particle diameter of 0.2 μm were weight in a manner that the compositions of the sintered products were as shown in Table 2, and were pulverized and mixed together using alumina balls as a medium. The mixture powders were then molded under a pressure of 1 ton/cm² and were pre-fired at 1000° C. for two hours. The pre-fired products were sealed with metal. The pre-fired products were subjected to the hot isostatic pressure processing at 1700° C. under a pressure of 2000 atms for one hour. The sintered products were measured for their milling rates and surface coarsenesses in the same manner as in Example 1. The results were as shown in Table 2.

TABLE 2

| Sample No. | Composition (vol %) (main components) | | Amount of ZrO$_2$ per 100 parts by weight of main components (parts by wt.) | Density (g/cc) | Hardness (GPa) | Strength (MPa) | Young's modulus (GPa) | Presence of pores | Milling rate (A/min) | Surface coarseness after milling (Ra mm) |
| --- | --- | --- | --- | --- | --- | --- | --- | --- | --- | --- |
| | SiC | Al$_2$O$_3$ | | | | | | | | |
| 13 | 40 | 60 | — | 3.68 | 18.7 | 650 | 408 | yes | 120 | 80 |
| 14 | 42 | 58 | — | 3.67 | 18.5 | 610 | 415 | yes | 145 | 75 |
| 15 | 44 | 56 | 4 | 3.66 | 18.8 | 650 | 425 | yes | 135 | 93 |
| 16 | 44 | 56 | 0.1 | 3.64 | 19.3 | 700 | 420 | yes | 132 | 81 |
| 17 | 50 | 50 | — | 3.61 | 20.2 | 550 | 435 | yes | 155 | 76 |
| 18 | 65 | 35 | — | 3.48 | 19.9 | 600 | 445 | yes | 170 | 78 |
| 19 | 95 | 5 | — | 3.26 | 17.3 | 430 | 410 | yes | 165 | 75 |
| *20 | 96 | 2 | — | 2.98 | 16.0 | 290 | 320 | no | 177 | 150 |

Samples marked with * lie outside the scope of the invention.

It will be understood from Table 2 that the samples Nos. 13 to 19 of the present invention have large Young's moduli, do not contain pores of larger than 1 μm in the sintered products thereof, milled at increased rates, and acquire favorable surface coarsenesses after milling. The samples were further examined for their slide property in the same manner as in Example 1, and it was confirmed that the samples Nos. 13 to 19 were not damaged on the disks or on the heads even after 30000 times of CSSs and exhibited excellent slide property.

Example 3

The starting materials of compositions of Table 1 were molded under a pressure of 1 ton/cm$^2$, and were pre-fired at 1000° C. for two hours. The pre-fired products were sealed with metal. The pre-fired products were subjected to the hot isostatic pressure processing at 1750° C. under a pressure of 2000 atms for one hour. The sintered products were measured for their milling rates and surface coarsenesses in the same manner as in Example 1. The results were as shown in Table 3.

confirmed that the samples Nos. 13 to 19 were not damaged on the disks or on the heads even after 3000 times of CSSs and exhibited excellent slide property.

Reference Example 1

A starting material of silicon carbide having an average particle diameter of 1.5 μm and a starting material of alumina having an average particle diameter of 0.5 μm in a composition of the sample No. 7 of Table 1 were pulverized and mixed together using alumina balls as a medium, and were fired in the same manner as in Example 1. The sintered product contained pores of larger than 1 μm. The slide testing was conducted in the same manner as in Example 1, and it was found that the disk was damaged after 300 times of CSSs.

Example 4

A zirconium carbide powder having an average particle diameter of 0.96 μm and an alumina powder having an average particle diameter of 0.4 μm were molded as starting materials under a pressure of 1 ton/cm$^2$, and were pre-fired

TABLE 3

| Sample No. | Composition (vol %) (main components) | | Amount of ZrO$_2$ per 100 parts by weight of main components (parts by wt.) | Density (g/cc) | Hardness (GPa) | Strength (MPa) | Young's modulus (GPa) | Presence of pores | Milling rate (A/min) | Surface coarseness after milling (Ra mm) |
| --- | --- | --- | --- | --- | --- | --- | --- | --- | --- | --- |
| | SiC | Al$_2$O$_3$ | | | | | | | | |
| 21 | 40 | 60 | — | 3.69 | 21.8 | 890 | 410 | yes | 110 | 55 |
| 22 | 42 | 58 | — | 3.67 | 22.3 | 980 | 430 | yes | 130 | 50 |
| 23 | 44 | 58 | 4 | 3.66 | 20.2 | 960 | 420 | yes | 125 | 60 |
| 24 | 44 | 56 | 0.1 | 3.66 | 20.4 | 1100 | 433 | yes | 130 | 55 |
| 25 | 44 | 56 | — | 3.65 | 22.2 | 890 | 441 | yes | 133 | 63 |
| 26 | 50 | 50 | — | 3.60 | 20.4 | 790 | 451 | yes | 150 | 65 |
| 27 | 65 | 35 | — | 3.49 | 22.0 | 886 | 453 | yes | 155 | 60 |
| 28 | 95 | 5 | — | 3.42 | 19.6 | 680 | 440 | yes | 166 | 68 |
| *29 | 98 | 2 | — | 2.98 | 18.3 | 510 | 390 | no | 170 | 110 |

Samples marked with * lie outside the scope of the invention.

It will be understood from Table 3 that even when subjected to the hot isostatic pressure processing, the ceramics exhibit Young's moduli of not smaller than 410 GPa without containing pores of larger than 1 μm in the sintered products thereof, are milled at rates of larger than 110 A/min., and acquire favorable surface coarsenesses after milling.

The samples were further examined for their slide property in the same manner as in Example 1, and it was in an nitrogen atmosphere at 1000° C. for two hours. The pre-fired products were sealed with a metal and were subjected to the hot isostatic pressure firing (HIP) at 1700° C. under a pressure of 2000 atms for one hour to obtain fired ceramics having compositions shown in Table 4.

The ceramics were measured for their densities, hardnesses, strengths, Young's moduli, presence of pores, milling rates and surface coarsenesses after milling nearly in the same manner as in Example 1.

The results were as shown in Table 4.

TABLE 4

| Sample No. | Composition (vol %) (main components) Zirconium carbide | Composition (vol %) (main components) Alumina | Amount of ZrO$_2$ per 100 pts by wt of main components (pts by wt.) | Density (g/cc) | Hardness (GPa) | Strength (MPa) | Young's modulus (GPa) | Presence of pores | Milling rate (A/min) | Surface coarseness after milling (Ra mm) |
|---|---|---|---|---|---|---|---|---|---|---|
| *30 | 4 | 96 | 0 | 4.07 | 19.2 | 702 | 395 | yes | 145 | 112 |
| 31 | 5 | 95 | 0 | 4.10 | 19.6 | 755 | 401 | yes | 152 | 98 |
| 32 | 10 | 90 | 0 | 4.22 | 19.2 | 812 | 405 | yes | 162 | 91 |
| 33 | 26 | 74 | 0 | 4.64 | 20.1 | 856 | 395 | yes | 154 | 85 |
| 34 | 26 | 74 | 0.1 | 4.65 | 20.2 | 905 | 398 | yes | 152 | 82 |
| 35 | 44 | 56 | 2 | 5.13 | 21.1 | 958 | 412 | yes | 154 | 94 |
| 36 | 55 | 45 | 3 | 5.41 | 21.2 | 905 | 405 | yes | 182 | 91 |
| 37 | 55 | 45 | 0 | 5.42 | 21.5 | 808 | 398 | yes | 175 | 96 |
| *38 | 60 | 40 | 0 | 5.52 | 18.5 | 710 | 381 | no | 192 | 111 |

Samples marked with * lie outside the scope of the invention.

It will be understood from Table 4 that the non-magnetic ceramics of the present invention (samples Nos. 31 to 37) have Young's moduli of not smaller than 395 GPa which are nearly comparable to that of a conventional alumina/titanium carbide material, do not contain pores of larger than 1 μm in the sintered products, are milled at rates of not smaller than 152 A/min. and acquire surface coarsenesses Ra of not larger than 98 nm after milling. The samples Nos. *30 and 33 were also tested for CSS in the same manner as in Example 1. As a result, it was found that the sample No. *30 was damaged after 30000 times of CSSs whereas the composite material of sample No. 33 of the present invention was not damaged even after 40000 times of CSSs exhibiting excellent slide property.

Example 5

A starting powder of boron carbide having an average particle diameter of 0.96 μm and a starting powder of alumina having an average particle diameter of 0.4 μm were weight in a manner that the compositions of the sintered products were as shown in Table 5, and were pulverized and mixed together using alumina balls as a medium. The mixed and pulverized starting powders were dried, granulated through a sieve of 40 meshes, packaged in a carbon mold, and were hot-pressed under a pressure of 400 kgf/cm$^2$ at 1750° C. for 0.5 hour. Properties of the sintered products were further measured for their densities, hardnesses, strengths, Young's moduli, presence of pores, milling rates and surface coarsenesses after milling in the same manner is in Example 1. The results were as shown in Table 5.

TABLE 5

| Sample No. | Composition (vol %) (main components) Boron carbide | Composition (vol %) (main components) Alumina | Amount of ZrO$_2$ per 100 pts by wt of main components (pts by wt.) | Density (g/cc) | Hardness (GPa) | Strength (MPa) | Young's modulus (GPa) | Presence of pores | Milling rate (A/min) | Surface coarseness after milling (Ra mm) |
|---|---|---|---|---|---|---|---|---|---|---|
| *39 | 4 | 96 | 0 | 3.93 | 17.5 | 152 | 395 | yes | 88 | 112 |
| 40 | 5 | 95 | 0 | 3.91 | 18.1 | 323 | 384 | yes | 102 | 82 |
| 41 | 10 | 90 | 0 | 3.84 | 19.3 | 557 | 392 | yes | 102 | 74 |
| 42 | 26 | 74 | 0 | 3.58 | 19.6 | 765 | 406 | yes | 105 | 76 |
| 43 | 26 | 74 | 5 | 3.60 | 18.5 | 832 | 383 | yes | 115 | 85 |
| 44 | 26 | 74 | 0.1 | 3.60 | 20.8 | 816 | 401 | yes | 109 | 69 |
| 45 | 44 | 56 | 2 | 3.34 | 21.2 | 853 | 412 | yes | 121 | 87 |
| 46 | 55 | 45 | 3 | 3.16 | 19.8 | 769 | 408 | yes | 119 | 76 |
| 47 | 55 | 45 | 0 | 3.15 | 18.2 | 686 | 425 | yes | 125 | 88 |
| *48 | 60 | 40 | 0 | 2.99 | 14.3 | 450 | 356 | no | 135 | 185 |

Samples marked with * lie outside the scope of the invention.

It will be understood from Table 5 that the non-magnetic ceramics of the present invention (samples No. 40 to 47) have Young's moduli of not smaller than 383 GPa that are nearly comparable to that of the conventional alumina/titanium carbide material, do not contain pores of larger than 1 μm in the sintered products, are milled at a rate of not smaller than 102 A/min, and acquire surface coarsenesses Ra after milling of not larger than 88 nm. In the case of the conventional aluminum/titanium carbide composite material (sample No. #12 of Table 1), on the other hand, the Young's modulus is as large as 398 GPa but the surface coarseness Ra after milling is as large as 110 nm despite the milling rate is small. It will be understood that the materials of the present invention are milled at rates larger than that of the alumina 30 wt %/titanium carbide material, and acquire small degree of surface coarsenesses.

The samples Nos. #39 and 42 were tested for CSS in the same manner as in Example 1, and it was found that the sample No. #39 was damaged after 30000 times of CSSs whereas the composite material of the sample No. 42 of the present invention was not damaged even after 40000 times of CSSs exhibiting excellent slide property. In preparing the sliders, furthermore, the sample No. 48 developed chipping of larger than 50 μm to some extent on the rail surfaces (air bearing surfaces) whereas the sample No. 47 did not at all develop chipping.

Example 6

The starting materials of compositions shown in Table 5 of Example 5 were molded under a pressure of 1 ton/cm² and were pre-fired in an argon atmosphere at 1000° C. for two hours. The pre-fired products were sealed with a metal and were subjected to the hot isostatic pressure firing (HIP) at 1700° C. under a pressure of 2000 atms for one hour. Properties of the materials were as shown in Table 6. The materials were further measured for their densities, hardnesses, strengths, Young's moduli, presence of pores, milling rates, and surface coarsenesses after milling in the same manner as in Example 1. The results were as shown in Table 6.

1 μm in the sintered products thereof, are milled at rates of not smaller than 96 A/min. and acquire surface coarsenesses Ra after milling of not larger than 86 nm. Furthermore, the sample No. 51 was tested for its CSS in the same manner as in Example 1. As a result, it was found that the composite material of sample No. 51 of the present invention was not damaged even after 40000 times of CSSs and exhibited excellent slide property.

Example 7

A starting material of titanium oxide having an average particle diameter of 0.6 μm and a starting material of alumina having an average particle diameter of 0.44 μm were weighed in a manner that the compositions of the sintered products were as shown in Table 7, and were pulverized and mixed together using alumina balls as a medium. The mixed starting materials were dried, granulated through a sieve of 40 meshes, packaged into a carbon mold, and were hot-pressed under a pressure of 350 kgf/cm² at a temperature of 1150° C. to 1300° C. The sintered

TABLE 6

| Sample No. | Composition (vol %) (main components) | | Amount of ZrO₂ per 100 pts by wt of main components (pts by wt.) | Density (g/cc) | Hardness (GPa) | Strength (MPa) | Young's modulus (GPa) | Presence of pores | Milling rate (A/min) | Surface coarseness after milling (Ra mm) |
|---|---|---|---|---|---|---|---|---|---|---|
| | Boron carbide | Alumina | | | | | | | | |
| 49 | 5 | 95 | 0 | 3.91 | 20.6 | 615 | 405 | yes | 98 | 77 |
| 50 | 10 | 90 | 0 | 3.84 | 20.1 | 625 | 401 | yes | 96 | 75 |
| 51 | 26 | 74 | 0 | 3.60 | 19.8 | 910 | 412 | yes | 97 | 71 |
| 52 | 26 | 74 | 5 | 3.60 | 18.5 | 916 | 386 | yes | 103 | 81 |
| 53 | 26 | 74 | 0.1 | 3.60 | 21.1 | 874 | 405 | yes | 98 | 70 |
| 54 | 44 | 56 | 2 | 3.33 | 21.5 | 866 | 415 | yes | 104 | 75 |
| 55 | 55 | 45 | 3 | 3.17 | 20.9 | 842 | 410 | yes | 111 | 71 |
| 56 | 55 | 45 | 0 | 3.17 | 21.0 | 805 | 427 | yes | 112 | 86 |
| *57 | 60 | 40 | 0 | 3.07 | 18.9 | 580 | 385 | no | 129 | 164 |

Samples marked with * lie outside the scope of the invention.

It will be understood from Table 6 that the non-magnetic ceramics of the present invention (samples Nos. 49 to 56) have Young's moduli of not smaller than 386 GPa which are nearly the same as those of the conventional alumina/titanium carbide material, do not contain pores of larger than products exhibited properties as shown in Table 7.

TABLE 7

| Sample No. | Composition (vol %) (main components) | | Amount of ZrO₂ per 100 pts by wt of main components (pts by wt.) | Density (g/cc) | Hardness (GPa) | Strength (MPa) | Young's modulus (GPa) | Presence of pores | Volume resistivity (Ω cm) | Volume resistivity after heat treatment (Ω cm) | Milling rate (A/min) | Surface coarseness after milling (Ra mm) |
|---|---|---|---|---|---|---|---|---|---|---|---|---|
| | TiO₂ | Al₂O₃ | | | | | | | | | | |
| *58 | 23.7 | 76.3 | — | 4.06 | 14.9 | 327 | 356 | yes | $2 \times 10^3$ | $3 \times 10^{11}$ | 210 | 80 |
| 59 | 17.0 | 83.0 | — | 4.05 | 15.3 | 411 | 380 | yes | $4 \times 10^4$ | $5 \times 10^{11}$ | 190 | 70 |
| 60 | 10.1 | 89.9 | — | 4.03 | 16.8 | 509 | 394 | yes | $7 \times 10^4$ | $7 \times 10^{10}$ | 180 | 75 |
| 61 | 3.6 | 96.4 | — | 4.00 | 18.3 | 513 | 395 | yes | $7 \times 10^8$ | $7 \times 10^{12}$ | 155 | 55 |
| 62 | 1.0 | 99.0 | — | 3.99 | 18.1 | 512 | 399 | yes | $6 \times 10^{10}$ | $6 \times 10^{12}$ | 135 | 50 |
| *63 | 0 | 100 | — | 3.98 | 18.1 | 533 | 360 | no | $5 \times 10^{12}$ | $8 \times 10^{12}$ | 85 | 60 |
| 64 | 10.1 | 89.9 | 0.1 | 4.03 | 16.2 | 613 | 392 | yes | $3 \times 10^4$ | $5 \times 10^{11}$ | 175 | 80 |
| 65 | 10.1 | 89.9 | 3.0 | 4.07 | 15.5 | 635 | 387 | yes | $8 \times 10^4$ | $4 \times 10^{11}$ | 185 | 78 |
| 66 | 10.1 | 89.9 | 5.0 | 4.09 | 15.3 | 651 | 385 | yes | $2 \times 10^4$ | $6 \times 10^{11}$ | 160 | 60 |
| 67 | 3.6 | 96.4 | 5.0 | 4.00 | 16.6 | 536 | 397 | yes | $9 \times 10^6$ | $6 \times 10^{12}$ | 145 | 45 |
| 68 | 1.0 | 99.0 | 0.1 | 3.99 | 18.2 | 554 | 403 | yes | $7 \times 10^{11}$ | $5 \times 10^{12}$ | 100 | 50 |

Samples marked with * lie outside the scope of the invention.

The density was measured in compliance with the Archmedes' method and the hardness was measured by using a hardness tester AVK (manufactured by Akashi Mfg. Co.). The measuring conditions consisted of exerting a load of 20 kgf for 15 seconds using a Vickers' indenter, and the measurement was taken relying upon the size of the scar formed by the indenter. The strength was measured based on a three-point bending test across a span of 30 mm by preparing test pieces having a section of 3 mm×4 mm. The head speed at this moment was 0.5 mm/min. The Young's modulus was measured by preparing samples having the same shape as those of measuring the strength, pulse echo method, and by measuring the amounts of deformation and gradients of load values. Presence or absence of pores was observed by polishing the samples using 1-μm diamond abrasive particles, and observing the polished surface using a scanning-type electron microscope to find presence of pores which are not smaller than 1 μm.

Next, the volume resistivities were measured based upon the four-terminal method by applying a silver paste onto both ends of test pieces measuring 3 mm×4 mm×40 mm. Furthermore, the volume resistivities were measured after the samples were heat-treated in an oxidizing atmosphere at a temperature of 1100° C. for two hours. Furthermore, by using an argon source of Kaufmann-type, the heat-treated samples were subjected to the milling to find the milling rate and the surface coarseness after milling. The acceleration voltage was 800 V, and the argon beam was allowed to be incident at an angle of 45 degrees with respect to a normal to the surface of the sample being machined. For the purpose of comparison, the alumina/titanium carbide composite material (TF700H) was also subjected to the milling. The surface coarseness was measured by using an atomic force microscope (AFM) manufactured by Digital Instruments Co. As the AFM. use was made of a probe of silicon nitride having a probe tip curvature R of 10 to 30 nm manufactured by Olympus Co. The visual field of measurement was a 10-μm square. The milling rate was found by using a surface coarseness tester and by measuring a step between the milled surface and the covered surface.

It will be understood from Table 7 that the non-magnetic ceramics of the present invention have Young's moduli of not smaller than 380 GPa, do not contain pores of larger than 1 μm in the sintered products thereof, are milled at rates of 100 A/min. or larger, and have favorable surface coarsenesses after milling. On the other hand, the conventional alumina/titanium carbide composite material exhibits the Young's modulus of as high as 398 GPa, but produces large load during the machining, milled at a small rate, and develops a large surface coarseness Ra after milling.

Next, the samples were formed into sliders each having a size of 1.6×2.2×0.9 and two rails, and were tested by using a CSS tester manufactured by Haruna Tsushin Co. to evaluate the number of times of CSSs, damage to the disk and damage to the heads. The testing was conducted by sliding the slider on the disk, revolving the disk at a maximum revolving speed of 3600 rpm, accelerating the disc from the standstill up to 3600 rpm over a period of five seconds, holding the revolving speed of 3600 rpm for three seconds, bringing the disk into a halt 5 seconds thereafter, and holding the standstill state for five seconds. A series of these operations constituted one time of CSS. As a result, the samples of Nos. 59 to 62, 63 to 68 were not damaged in the disk or in the head even after 40000 times CSSs and exhibited excellent slide property.

Example 8

A starting material of titanium oxide having an average particle diameter of 0.55 μm and a starting material of alumina having an average diameter of 0.44 μm were weighed in a manner that the compositions of the sintered products were as shown in Table 8, and were pulverized and mixed together using alumina balls as a medium. The mixed starting materials were dried, granulated through a sieve of 40 meshes, and were further granulated by being added with a paraffin wax as a binder. The starting materials were then molded and pre-fired at 1175° C. to 1300° C. Table 8 shows relative densities of the pre-fired products calculated from their specific gravities and compositions.

TABLE 8

| Sample No. | Composition (vol %) (main components) | | Amount of $ZrO_2$ per 100 parts by weight of main components (pts by wt.) | Density (g/cc) | Hardness (GPa) | Strength (MPa) | Young's modulus (GPa) | Presence of pores |
|---|---|---|---|---|---|---|---|---|
| | $TiO_2$ | $Al_2O_3$ | | | | | | |
| *69 | 23.7 | 76.3 | — | 4.06 | 15.1 | 331 | 358 | yes |
| 70 | 17.0 | 83.0 | — | 4.05 | 16.5 | 455 | 383 | yes |
| 71 | 10.1 | 89.9 | — | 4.03 | 17.2 | 516 | 395 | yes |
| 72 | 10.1 | 89.9 | 0.1 | 4.03 | 17.3 | 620 | 394 | yes |
| 73 | 10.1 | 89.9 | 3.0 | 4.07 | 16.3 | 660 | 388 | yes |
| 74 | 10.1 | 89.9 | 5.0 | 4.09 | 15.7 | 710 | 386 | yes |
| 75 | 3.6 | 96.4 | 5.0 | 4.00 | 16.8 | 560 | 401 | yes |
| 76 | 1.0 | 99.0 | 0.1 | 3.98 | 16.1 | 653 | 409 | yes |
| *77 | 0 | 100 | — | 3.80 | 15.5 | 415 | 320 | no |

| Sample No. | Density after pre-firing (g/cc) | Relative density after pre-firing (%) | Volume resistivity (Ω cm) | Volume resistivity after heat treatment (Ω cm) | Milling rate (A/min) | Surface coarseness after milling (Ra nm) |
|---|---|---|---|---|---|---|
| *69 | 4.02 | 99 | $1 \times 10^{10}$ | $3 \times 10^{12}$ | 185 | 71 |
| 70 | 3.93 | 97 | $1 \times 10^{10}$ | $4 \times 10^{12}$ | 178 | 46 |
| 71 | 3.95 | 98 | $2 \times 10^{10}$ | $3 \times 10^{12}$ | 168 | 62 |
| 72 | 3.94 | 98 | $3 \times 10^{10}$ | $3 \times 10^{12}$ | 163 | 63 |
| 73 | 3.99 | 98 | $2 \times 10^{10}$ | $2 \times 10^{12}$ | 162 | 69 |
| 74 | 3.97 | 97 | $1 \times 10^{10}$ | $5 \times 10^{12}$ | 164 | 63 |

TABLE 8-continued

| 75 | 3.84 | 96 | $2 \times 10^{11}$ | $7 \times 10^{12}$ | 105 | 80 |
| 76 | 3.79 | 95 | $3 \times 10^{12}$ | $8 \times 10^{12}$ | 85 | 60 |
| *77 | 3.70 | 93 | $5 \times 10^{12}$ | $6 \times 10^{12}$ | 75 | 50 |

Samples marked with * lie outside the scope of the invention.

The pre-sintered products were subjected to the HIP processing in an argon atmosphere at 1200° to 1300° C. for one hour and were measured for their densities, hardnesses, strengths, Young's moduli, presence of pores, milling rates, surface coarsenesses after milling and volume resistivities in the same manner as in Example 7. The results were as shown in Table 8. The volume resistivities are those of after the HIP processing and after subjected to the heat-treatment in an oxidizing atmosphere at a temperature of 1100° C. for two hours like in Example 7. The slide property was examined in the same manner as in Example 7 and it was found that the samples Nos. 70 to 76 were not damaged in the disk or in the head even after 40000 times of CSSs, exhibiting excellent slide property.

Reference Example 2

A starting material of titanium oxide having an average particle diameter of 1.5 μm and a starting material of alumina having an average particle diameter of 0.44 μm were weighed in a manner that the compositions of the sintered products were as shown in Table 9, and were pulverized and mixed together using alumina balls as a medium. The mixed starting materials were dried, granulated through a sleve of 40 meshes, and were further granulated by being added with a paraffin wax as a binder. The starting materials were molded and were pre-fired in an oxidizing atmosphere at 1175° to 1350° C. for two hours. Table 9 shows relative densities of the pre-fired products calculated from their specific gravities and compositions.

TABLE 9

| Sample No. | Composition (main components) (% by weight) | | Amount of ZrO₂ per 100 parts by weight of main components (parts by weight) | Specific gravity | Relative density (%) | Relative density after HIP (%) |
| --- | --- | --- | --- | --- | --- | --- |
| | TiO₂ | Al₂O₃ | | | | |
| 78 | 23.7 | 76.3 | — | 3.82 | 94 | 97 |
| 79 | 17.0 | 83.0 | — | 3.81 | 94 | 97 |
| 80 | 10.1 | 89.9 | — | 3.75 | 93 | 96 |
| 81 | 10.1 | 89.9 | 5.0 | 3.84 | 94 | 97 |
| 82 | 3.6 | 96.4 | 5.0 | 3.88 | 95 | 97 |
| 83 | 1.0 | 99.0 | 0.1 | 3.71 | 93 | 96 |

The pre-sintered products were subjected to the HIP processing in an argon atmosphere at 1200° to 1350° C. However, there were not obtained dense sintered products having relative densities of not smaller than 99%, from which it will be understood that densely sintered products are not obtained from the starting titanium oxide having an average particle diameter of 1.5 μm despite the HIP processing is executed.

Example 9

A starting powder of aluminum boride (AlB₁₂) having an average particle diameter of 0.8 μm and a starting powder of alumina having an average particle diameter of 0.2 μm were weighed in a manner that the compositions of the sintered products were as shown in Table 10, and were pulverized and mixed together using alumina balls as a medium. Here, the average particle diameters were 50% particle diameters by microtrack. The mixed starting powders were dried, granulated through a sieve of 40 meshes, packaged into a carbon mold and were hot-pressed under a pressure of 350 kgf/cm² at 1750° C. for one hour. Properties of the sintered products were as shown in Table 10.

TABLE 10

| Sample No. | Composition (vol %) (main components) | | Amount of ZrO₂ per 100 pts by wt of main components (pts by wt.) | Density (g/cc) | Hardness (GPa) | Strength (MPa) | Young's modulus (GPa) | Presence of pores | Surface coarseness after milling (Ra mm) |
| --- | --- | --- | --- | --- | --- | --- | --- | --- | --- |
| | Aluminium boride | Alumina | | | | | | | |
| *84 | 0.5 | 99.5 | — | 3.90 | 18.5 | 360 | 360 | no | 110 |
| 85 | 1 | 99 | — | 3.89 | 18.5 | 560 | 390 | yes | 67 |
| 86 | 10 | 90 | — | 3.81 | 19.8 | 690 | 400 | yes | 54 |
| 87 | 25 | 75 | — | 3.59 | 19.1 | 760 | 420 | yes | 68 |
| 88 | 25 | 75 | 5 | 3.61 | 18.3 | 840 | 390 | yes | 63 |
| 89 | 25 | 75 | 0.1 | 3.61 | 20.8 | 992 | 435 | yes | 51 |
| 90 | 44 | 56 | 2 | 3.34 | 21.2 | 870 | 433 | yes | 63 |
| 91 | 60 | 40 | 3 | 3.10 | 19.8 | 880 | 437 | yes | 68 |
| 92 | 60 | 40 | — | 3.10 | 22.5 | 995 | 440 | yes | 61 |
| 93 | 95 | 5 | — | 2.57 | 22.9 | 920 | 435 | yes | 57 |

Samples marked with * lie outside the scope of the invention.

The density was measured in compliance with the Archmedes' method and the hardness was measured by using a hardness tester AVK (manufactured by Akashi Mfg. Co.). The measuring conditions consisted of exerting a load of 20 kgf for 15 seconds using a Vickers' indenter, and the measurement was taken relying upon the size of the scar formed by the indenter. The strength was measured based on a three-point bending test across a span of 30 mm by preparing test pieces having a section of 3 mm×4 mm. The head at this moment was 0.5 mm/min. The Young's modulus was measured by preparing samples having the same shape as those of measuring the strength, exerting loads at three points, and by measuring the amounts of deformation and gradients of load values. Presence or absence of pores was observed by polishing the samples using 1-μm diamond abrasive particles, and observing the polished surface using a scanning-type electron microscope to find presence of pores which are not smaller than 1 μm.

Next, by using an argon source of Kaufmann-type, the samples were subjected to the milling to find the milling rate and the surface coarseness after milling. The acceleration voltage was 800 V, and the argon beam was allowed to be incident at an angle of 45 degrees with respect to a normal to the surface of the sample being machined. For the purpose of comparison, the alumina/titanium carbide composite material (TF700H) was also subjected to the milling. The surface coarseness was measured by using an atomic force microscope (AFM) manufactured by Digital Instruments Co. As the AFM, use was made of a probe of silicon nitride having a probe tip curvature R of 10 to 30 nm manufactured by Olympus Co. The visual field of measurement was a 10-μm square.

It will be understood from Table 10 that the non-magnetic ceramics of the present invention (samples Nos. 85 to 93) have Young's moduli of not smaller than 390 GPa which are nearly the same as that of the conventional alumina/titanium carbide material, do not contain pores of larger than 1 μm in the sintered products thereof, and have surface coarsenesses after milling of not larger than 68 nm.

Next, the samples Nos. 85 to 93 of Table 10 were formed into sliders each having a size of 1.6×2.2×0.9 and two rails, and were tested by using a CSS tester manufactured by Haruna Tsushin Co. to evaluate the number of times of CSSs, damage to the media and damage to the heads. The testing was conducted by sliding the slider on the disk, revolving the disk at a maximum revolving speed of 3600 rpm, accelerating the disc from the standstill up to 3600 rpm over a period of five seconds, holding the revolving speed of 3600 rpm for three seconds, bringing the disk into a halt 5 seconds thereafter, and holding the standstill state for five seconds. A series of these operations constituted one time of CSS. As a result, the composite materials of samples of Nos. 85 to 93 of the present invention were not damaged even after 30000 times CSSs and exhibited excellent slide property.

Example 10

A starting powder of aluminum boride ($AlB_{12}$) having an average particle diameter of 2.0 μm and a starting powder of alumina having an average particle diameter of 0.2 μm were weighed in a manner that the compositions of the sintered products were as shown in Table 11, were pulverized and mixed together using alumina balls as a media, and were calcined in the same manner as in Example 9. The sintered products were further measured for their presence of pores and surface coarsenesses in the same manner as in Example 9. The results were as shown in Table 11.

TABLE 11

| Sample No. | Composition (vol %) (main components) | | Amount of $ZrO_2$ per 100 pts by wt of main components (pts by wt.) | Density (g/cc) | Hardness (GPa) | Strength (MPa) | Young's modulus (GPa) | Presence of pores | Surface coarseness after milling (Ra mm) |
|---|---|---|---|---|---|---|---|---|---|
| | Aluminium boride | Alumina | | | | | | | |
| *94 | 0.5 | 99.5 | — | 3.90 | 18.2 | 350 | 335 | no | 110 |
| 95 | 1.0 | 99 | — | 3.88 | 18.4 | 490 | 385 | yes | 85 |
| 96 | 10 | 90 | — | 3.80 | 18.9 | 580 | 395 | yes | 80 |
| 97 | 25 | 75 | — | 3.59 | 18.7 | 655 | 415 | yes | 63 |
| 98 | 25 | 75 | 5 | 3.60 | 18.3 | 750 | 380 | yes | 66 |
| 99 | 25 | 75 | 0.1 | 3.60 | 20.5 | 853 | 430 | yes | 61 |
| 100 | 44 | 56 | 2 | 3.33 | 20.9 | 732 | 425 | yes | 68 |
| 101 | 60 | 40 | 3 | 3.09 | 19.5 | 733 | 422 | yes | 72 |
| 102 | 60 | 40 | — | 3.09 | 22.1 | 879 | 439 | yes | 74 |
| 103 | 95 | 5 | — | 2.55 | 22.5 | 780 | 433 | yes | 83 |

Samples marked with * lie outside the scope of the invention.

It will be understood from Table 11 that the samples Nos. 95 to 103 have Young's moduli of not smaller than 380 GPa, do not contain pores of larger than 1 μm in the sintered products, and acquire favorable surface coarsenesses after milling. Furthermore, the slide property was examined in the same manner as in Example 9, and it was confirmed that the samples Nos. 95 to 103 were not damaged in the disk or in the head even after 30000 times of CSSs exhibiting excellent slide property.

Example 11

The starting materials of compositions Nos. 85 to 93 of Table 10 of Example 9 were molded under a pressure of 1 ton/cm², and were pre-fired at 1000° C. for two hours. The pre-fired products were subjected to the hot isostatic pressure processing at 1700° C. under a pressure of 2000 atms for one hour. The sintered products were measured for their properties and surface coarsenesses after milling in the same manner as in Example 9. The results were as shown in Table 12.

TABLE 12

| Sample No. | Composition (vol %) (main components) Aluminium boride | Alumina | Amount of ZrO₂ per 100 pts by wt of main components (pts by wt.) | Density (g/cc) | Hardness (GPa) | Strength (MPa) | Young's modulus (GPa) | Presence of pores | Surface coarseness after milling (Ra nm) |
|---|---|---|---|---|---|---|---|---|---|
| *104 | 0.5 | 99.5 | — | 3.91 | 18.8 | 375 | 365 | no | 105 |
| 105 | 1.0 | 99 | — | 3.97 | 19.8 | 780 | 410 | yes | 55 |
| 106 | 10 | 90 | — | 3.84 | 19.9 | 780 | 405 | yes | 45 |
| 107 | 25 | 75 | — | 3.64 | 19.4 | 880 | 415 | yes | 43 |
| 108 | 25 | 75 | 5 | 3.64 | 18.5 | 835 | 400 | yes | 53 |
| 109 | 25 | 75 | 0.1 | 3.63 | 20.9 | 995 | 430 | yes | 51 |
| 110 | 44 | 56 | 2 | 3.36 | 21.5 | 870 | 440 | yes | 57 |
| 111 | 60 | 40 | 3 | 3.12 | 22.5 | 865 | 440 | yes | 62 |
| 112 | 60 | 40 | — | 3.13 | 23.0 | 998 | 445 | yes | 61 |
| 113 | 95 | 5 | — | 2.63 | 22.9 | 780 | 435 | yes | 59 |
| *114 | 98 | 2 | — | 2.56 | 20.2 | 550 | 360 | yes | 110 |

Samples marked with * lie outside the scope of the invention.

It will be understood from Table 12 that even when subjected to the hot isostatic pressure processing, the samples exhibit Young's moduli of not smaller than 400 GPa, do not contain pores of larger than 1 µm in the sintered products, and acquire surface coarsenesses Ra after milling of not larger than 62 nm. Furthermore, the slide property was examined in the same manner as in Example 9 and it was confirmed that the samples Nos. 105 to 113 were not damaged in the disk or in the head even after 30000 times of CSSs exhibiting excellent slide property.

Reference Example 3

A starting material of aluminum boride having an average particle diameter of 8.68 µm and a starting material of alumina having an average particle diameter of 0.8 µm were pulverized and mixed together in a composition No. 86 in Table 10 using alumina balls as a medium, and were fired in the same manner as in Example 9. The sintered product contained pores of larger than 1 µm. The slide test was conducted in the same manner as in Example 9. As a result, the disk was damaged after 300 times of CSSs.

Example 12

A starting powder of zirconium boride having an average particle diameter of 0.7 µm and a starting powder of alumina having an average particle diameter of 0.2 µm were molded under a pressure of 1 ton/cm², pre-fired in an argon atmosphere at 1000° C. for two hours, were sealed with a metal, and were subjected to the hot isostatic pressure firing (HIP) at 1700° C. under a pressure of 2000 atms for one hour to obtain fired ceramics having compositions shown in Table 13.

The ceramics were measured for their densities, hardnesses, strengths, Young's moduli, presence of pores, milling rates, and surface coarsenesses after milling. The results were as shown in Table 13.

TABLE 13

| Sample No. | Composition (vol %) (main components) Zirconium carbide | Alumina | Amount of ZrO₂ per 100 pts by wt of main components (pts by wt.) | Density (g/cc) | Hardness (GPa) | Strength (MPa) | Young's modulus (GPa) | Presence of pores | Milling rate (A/min) | Surface coarseness after milling (Ra nm) |
|---|---|---|---|---|---|---|---|---|---|---|
| *115 | 3 | 97 | 0 | 4.03 | 19.3 | 625 | 398 | no | 135 | 108 |
| 116 | 5 | 95 | 0 | 4.08 | 19.4 | 712 | 405 | yes | 125 | 96 |
| 117 | 10 | 90 | 0 | 4.19 | 19.2 | 756 | 412 | yes | 146 | 98 |
| 118 | 26 | 74 | 0 | 4.53 | 19.8 | 852 | 429 | yes | 138 | 89 |
| 119 | 26 | 74 | 5 | 4.53 | 18.9 | 826 | 423 | yes | 128 | 92 |
| 120 | 26 | 74 | 0.1 | 4.54 | 19.5 | 765 | 432 | yes | 119 | 96 |
| 121 | 44 | 56 | 3 | 4.91 | 20.5 | 836 | 428 | yes | 124 | 93 |
| 122 | 60 | 40 | 0 | 5.25 | 20.8 | 847 | 435 | yes | 135 | 86 |
| 123 | 60 | 40 | 1 | 5.25 | 21.1 | 712 | 434 | yes | 142 | 92 |
| 124 | 95 | 5 | 0 | 5.79 | 18.5 | 697 | 389 | yes | 154 | 99 |
| *125 | 98 | 2 | 0 | 5.78 | 17.2 | 523 | 354 | no | 171 | 165 |

Samples marked with * lie outside the scope of the invention.

It will be understood from Table 13 that the non-magnetic ceramics (samples Nos. 116 to 124) of the present invention have Young's moduli of not smaller than 389 GPa which are larger than that of the conventional alumina/titanium carbide material, do not contain pores of larger than 1 µm in the sintered products, are milled at rates of not smaller than 119 A/min. and acquire surface coarsenesses Ra after milling of not larger than 99 nm. The samples Nos. *115 and 118 were tested for their CSS in the same manner as in Example 1. The sample No. *115 was damaged after 30000 times of CSSs but the composite material of the sample No. 118 of the present invention was not damaged even after 40000 times of CSSs and exhibited excellent slide property.

I claim:

1. Non-magnetic ceramics for recording/reproducing heads comprising alumina in an amount of from 5 to 35% by volume and silicon carbide in an amount of from 65 to 95% by volume, wherein the ceramic is obtainable by processing under heat and pressure a pre-sintered mold body composed of alumina and silicon carbide and has a Young's modulus of not smaller than 370 GPa and a surface coarseness Ra after milling of not larger than 100 nm.

2. Non-magnetic ceramics for recording/reproducing heads comprising alumina, silicon carbide and zirconia, wherein the alumina is contained in an amount of from 5 to 60% by volume and the silicon carbide is contained in an amount of from 40 to 95% by volume, as a chief constituent, and the zirconia is contained in an amount of from 0.1 to 3 parts by weight per the total of 100 parts by weight of the alumina and the silicon carbide, and wherein the ceramic has a Young's modulus of not smaller than 370 GPa and a surface coarseness Ra after milling of not larger than 100 nm.

3. Non-magnetic ceramics for recording/reproducing heads comprising 74 to 45% by volume of alumina and 26 to 55% by volume of zirconium carbide, wherein the ceramic is obtainable by processing under heat and pressure a pre-sintered mold body composed of alumina and zirconium carbide and has a Young's modulus of not smaller than 370 GPa and a surface coarseness Ra after milling of not larger than 100 nm.

4. Non-magnetic ceramics for recording/reproducing heads comprising an alumina and any one of a compound selected from silicon carbide, boron carbide, zirconium carbide, titanium oxide, aluminum boride or zirconium boride, the ceramics having a Young's modulus of not smaller than 370 Gpa and a surface coarseness Ra after milling of not larger than 100 nm, which comprises from 95 to 45% by volume of an alumina and from 5 to 55% by volume of a boron carbide or a zirconium carbide, wherein zirconia is contained in an amount of from 0.1 to 5 parts by weight per the total of 100 parts by weight of the alumina and the boron carbide or the zirconium carbide.

5. Non-magnetic ceramics for recording/reproducing heads comprising 99 to 83% by volume of an alumina and 1 to 17% by volume of a titanium oxide, the ceramics having a Young's modulus of not smaller than 370 GPa and a surface coarseness Ra after milling of not larger than 100 nm.

6. Ceramics according to claim 5, wherein zirconia is contained in an amount of from 0.1 to 5 parts by weight per the total of 100 parts by weight of the alumina and the titanium oxide.

7. Ceramics according to claim 5 or 6, which comprises from 99 to 83% by volume of an alumina and from 1 to 17% by volume of a titanium oxide which are main components, as well as zirconia in an amount of from 0.1 to 5 parts by weight per 100 parts by weight of said main components, the ceramics exhibiting a volume resistivity of not smaller than $10^{10}$ Ω-cm.

8. Non-magnetic ceramics for recording/reproducing heads comprising 40 to 5% by volume of alumina and 60 to 95% by volume of an aluminum boride, wherein the ceramics is obtainable by processing under heat and pressure a pre-sintered mold body composed of alumina and aluminum boride and has a Young's modulus of not smaller than 370 GPa and a surface coarseness Ra after milling of not larger than 100 nm.

9. Non-magnetic ceramics for recording/reproducing heads comprising an alumina and any one of a compound selected from silicon carbide, boron carbide, zirconium carbide, titanium oxide, aluminum boride or zirconium boride, the ceramics having a Young's modulus of not smaller than 370 Gpa and a surface coarseness Ra after milling of not larger than 100 nm, which comprises from 99 to 5% by volume of an alumina and from 1 to 95% by volume of an aluminum boride, wherein zirconia is contained in an amount of from 0.1 to 5 parts by weight per the total of 100 parts by weight of the alumina and the aluminum boride.

10. Non-magnetic ceramics for recording/reproducing heads comprising an alumina and any one of a compound selected from silicon carbide, boron carbide, zirconium carbide, titanium oxide, aluminum boride or zirconium boride, the ceramics having a Young's modulus of not smaller than 370 Gpa and a surface coarseness Ra after milling of not larger than 100 nm, which comprises from 95 to 5% by volume of an alumina and from 5 to 95% by volume of a zirconium boride, wherein zirconia is contained in an amount of from 0.1 to 5 parts by weight per the total of 100 parts by weight of the alumina and the zirconium boride.

11. A method of producing non-magnetic ceramics for recording/reproducing heads comprising:

preparing a mixture powder containing 40 to 95% by volume of silicon carbide having an average particle diameter of not larger than 0.3 μm and 5 to 60% by volume of alumina, molding and pre-sintering the mixture to form a pre-sintered mold body, processing the pre-sintered mold body by hot isostatic pressure processing.

12. A method of producing non-magnetic ceramics for recording/reproducing heads comprising:

preparing at least one of a mixture powder, a molded product of a mixture powder, and a sintered product of a mixture powder, the mixture powder containing 1 to 17% by volume of a starting titanium oxide having an average particle diameter of not larger than 0.6 μm and from 99 to 83% by volume of an alumina, subjecting the at least one of the mixture powder, the molded product of the mixture powder, and the sintered product of the mixture powder to a hot-press processing at a temperature of from 1000° to 1300° C.

13. A method of producing non-magnetic ceramics for recording/reproducing heads wherein a mixture powder containing from 1 to 17% by volume of a starting titanium oxide having an average particle diameter of not larger than 0.6 μm and from 99 to 83% by volume of an alumina, or a molded product of the mixture powder, or a sintered product of the mixture powder, is subjected to a hot-press processing or to a hot isostatic pressure processing, wherein said mixture powder, or said molded product of said mixture powder, or said sintered product of said mixture powder, is subjected to the hot-press processing or to the hot isostatic pressure processing, and is then heat-treated in an oxidizing atmosphere at 800° to 1200° C.

* * * * *